(12) United States Patent
Yin et al.

(10) Patent No.: US 11,290,944 B2
(45) Date of Patent: Mar. 29, 2022

(54) DATA CONNECTION METHOD, CONTROL-PLANE NODE, AND USER EQUIPMENT

(71) Applicant: HUAWEI TECHNOLOGIES CO., LTD., Guangdong (CN)

(72) Inventors: Yu Yin, Shanghai (CN); Caixia Qi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 16/412,914

(22) Filed: May 15, 2019

(65) Prior Publication Data
US 2019/0268828 A1 Aug. 29, 2019

Related U.S. Application Data

(63) Continuation of application No. PCT/CN2017/093899, filed on Jul. 21, 2017.

(30) Foreign Application Priority Data

Nov. 16, 2016 (CN) .......................... 201611008023.2

(51) Int. Cl.
H04W 48/12 (2009.01)
H04W 8/08 (2009.01)
(Continued)

(52) U.S. Cl.
CPC ............ H04W 48/12 (2013.01); H04W 8/082 (2013.01); H04W 8/22 (2013.01); H04W 8/26 (2013.01);
(Continued)

(58) Field of Classification Search
CPC ..... H04W 76/30; H04W 76/11; H04W 76/32; H04W 76/34; H04W 76/36; H04W 8/082;
(Continued)

(56) References Cited

U.S. PATENT DOCUMENTS 7,408,910 B2 * 8/2008 Kimata ................. H04M 7/006
370/338
9,439,197 B1 * 9/2016 Ngo ...................... H04W 16/14
(Continued)

FOREIGN PATENT DOCUMENTS

CN 101795478 A 8/2010
CN 104469775 A 3/2015
(Continued)

OTHER PUBLICATIONS

Huawei, "Pseudo-CR on Sx Management Procedure," 3GPP TSG CT4 Meeting #75, C4-166xyz, Reno, US, Nov. 14-18, 2016, 7 pages.
(Continued)

Primary Examiner — Jenee Holland
(74) Attorney, Agent, or Firm — Slater Matsil, LLP

(57) ABSTRACT

Embodiments of this application disclose a data connection method, a control-plane node, and user equipment, to provide a mechanism in which user equipment can access an external packet data network by using a local network. The method includes: sending, by a control-plane node, access information to user equipment, where the access information includes at least one access point name and Internet agent capability indication information for each access point name; receiving, by the control-plane node, a connection setup message sent by the user equipment, where the connection setup message includes a first access point name, and the first access point name is determined by the user equipment based on the Internet agent capability indication information; and determining, by the control-plane node, a corresponding local user-plane node based on the first access point name, and setting up a data connection from the user equipment to the local user-plane node.

22 Claims, 6 Drawing Sheets

(51) Int. Cl.

| | | |
|---|---|---|
| *H04W 48/16* | (2009.01) | |
| *H04W 48/20* | (2009.01) | |
| *H04W 76/30* | (2018.01) | |
| *H04W 76/11* | (2018.01) | |
| *H04W 8/22* | (2009.01) | |
| *H04W 8/26* | (2009.01) | |
| *H04W 84/04* | (2009.01) | |

(52) U.S. Cl.
CPC ........... *H04W 48/16* (2013.01); *H04W 48/20* (2013.01); *H04W 76/11* (2018.02); *H04W 76/30* (2018.02); *H04W 84/045* (2013.01)

(58) Field of Classification Search
CPC ......... H04W 8/22; H04W 8/26; H04W 48/12; H04W 48/16; H04W 48/20; H04W 84/045; H04W 72/14; H04W 74/0866; H04L 29/12009
See application file for complete search history.

(56) References Cited

U.S. PATENT DOCUMENTS

| | | | | |
|---|---|---|---|---|
| 10,111,159 B2* | 10/2018 | Scahill | | H04W 48/20 |
| 2002/0101859 A1* | 8/2002 | Maclean | | H04L 69/22 |
| | | | | 370/352 |
| 2004/0203863 A1* | 10/2004 | Huomo | | G01S 5/02 |
| | | | | 455/456.1 |
| 2004/0236547 A1* | 11/2004 | Rappaport | | H04W 16/20 |
| | | | | 703/2 |
| 2004/0264427 A1* | 12/2004 | Jaakkola | | H04L 29/12783 |
| | | | | 370/338 |
| 2005/0048972 A1* | 3/2005 | Dorenbosch | | H04W 36/32 |
| | | | | 455/436 |
| 2005/0147073 A1* | 7/2005 | Hietalahti | | H04W 4/00 |
| | | | | 370/338 |
| 2005/0153683 A1* | 7/2005 | Gustafsson | | H04W 12/06 |
| | | | | 455/411 |
| 2006/0120517 A1* | 6/2006 | Moon | | H04W 76/50 |
| | | | | 379/45 |
| 2006/0217147 A1* | 9/2006 | Olvera-Hernandez | | |
| | | | | H04W 36/005 |
| | | | | 455/552.1 |
| 2007/0213081 A1* | 9/2007 | Zhang | | H04W 72/005 |
| | | | | 455/466 |
| 2007/0214283 A1* | 9/2007 | Metke | | H04L 61/1511 |
| | | | | 709/245 |
| 2007/0249291 A1* | 10/2007 | Nanda | | H04W 36/0083 |
| | | | | 455/73 |
| 2008/0101348 A1* | 5/2008 | Verkama | | H04L 61/00 |
| | | | | 370/356 |
| 2008/0186882 A1* | 8/2008 | Scherzer | | H04W 72/02 |
| | | | | 370/310 |
| 2008/0285492 A1* | 11/2008 | Vesterinen | | H04W 8/082 |
| | | | | 370/310 |
| 2009/0047947 A1* | 2/2009 | Giaretta | | H04W 48/17 |
| | | | | 455/432.1 |
| 2009/0132674 A1* | 5/2009 | Horn | | H04W 36/30 |
| | | | | 709/207 |
| 2009/0132675 A1* | 5/2009 | Horn | | H04W 36/0079 |
| | | | | 709/207 |
| 2009/0264098 A1* | 10/2009 | Lo | | H04W 12/50 |
| | | | | 455/411 |
| 2010/0017525 A1* | 1/2010 | Albert | | H04L 43/0811 |
| | | | | 709/229 |
| 2010/0027533 A1* | 2/2010 | Kant | | H04L 45/304 |
| | | | | 370/355 |
| 2010/0106844 A1* | 4/2010 | Ota | | H04L 12/6418 |
| | | | | 709/228 |
| 2010/0195632 A1* | 8/2010 | Prabhu | | H04W 36/32 |
| | | | | 370/338 |
| 2010/0210302 A1* | 8/2010 | Santori, Jr. | | H04M 1/72412 |
| | | | | 455/557 |
| 2010/0319023 A1* | 12/2010 | Ko | | H04N 7/17318 |
| | | | | 725/37 |
| 2011/0045826 A1* | 2/2011 | Kim | | H04W 8/082 |
| | | | | 455/426.1 |
| 2011/0153790 A1* | 6/2011 | Yoon | | H04L 41/5058 |
| | | | | 709/221 |
| 2011/0171953 A1* | 7/2011 | Faccin | | H04W 48/08 |
| | | | | 455/426.1 |
| 2011/0177811 A1* | 7/2011 | Heckman | | H04W 8/18 |
| | | | | 455/435.1 |
| 2011/0225632 A1* | 9/2011 | Ropolyi | | H04W 48/16 |
| | | | | 726/4 |
| 2012/0014316 A1* | 1/2012 | Rahman | | H04W 40/02 |
| | | | | 370/328 |
| 2012/0099578 A1* | 4/2012 | Aramoto | | H04W 8/20 |
| | | | | 370/338 |
| 2012/0238247 A1* | 9/2012 | Wen | | H04W 76/12 |
| | | | | 455/411 |
| 2013/0031615 A1* | 1/2013 | Woodward | | H04W 12/084 |
| | | | | 726/4 |
| 2013/0040603 A1* | 2/2013 | Stahlberg | | H04W 88/08 |
| | | | | 455/410 |
| 2013/0051303 A1* | 2/2013 | Huang | | H04W 48/12 |
| | | | | 370/312 |
| 2013/0210481 A1* | 8/2013 | Sane | | H04W 48/18 |
| | | | | 455/552.1 |
| 2013/0315068 A1* | 11/2013 | Kim | | H04W 8/18 |
| | | | | 370/236 |
| 2014/0064209 A1* | 3/2014 | Anchan | | H04W 76/25 |
| | | | | 370/329 |
| 2014/0161026 A1* | 6/2014 | Stojanovski | | H04W 40/02 |
| | | | | 370/328 |
| 2014/0211645 A1* | 7/2014 | Sekine | | H04W 48/12 |
| | | | | 370/252 |
| 2014/0211776 A1 | 7/2014 | Jang et al. | | |
| 2014/0244839 A1* | 8/2014 | Yoon | | H04L 43/10 |
| | | | | 709/224 |
| 2014/0355590 A1* | 12/2014 | Cho | | H04W 76/15 |
| | | | | 370/338 |
| 2015/0023341 A1* | 1/2015 | Zhao | | H04W 64/003 |
| | | | | 370/338 |
| 2015/0063331 A1* | 3/2015 | Scahill | | H04W 48/00 |
| | | | | 370/338 |
| 2016/0029303 A1* | 1/2016 | Sahu | | H04W 60/005 |
| | | | | 370/331 |
| 2017/0064622 A1* | 3/2017 | Wang | | H04W 88/08 |

FOREIGN PATENT DOCUMENTS

| | | |
|---|---|---|
| EP | 2665327 A1 | 11/2013 |
| WO | 2010129931 A1 | 11/2010 |
| WO | 2014127374 A2 | 8/2014 |
| WO | 2015082071 A1 | 6/2015 |

OTHER PUBLICATIONS

International Search Report dated Oct. 18, 2017 in corresponding International Application No. PCT/CN2017/093899.

Huawei, "Psuedo-CR on Sx Management Procedure," 3GPP TSG CT4 Meeting #75, C4-166xyz, Reno, US, Nov. 14-18, 2016, 7 pages.

Samsung, "Update to Solution 5.3: Re-selection of user-plane path based on UE traffic pattern," SA WG2 Meeting #116BIS, S2-165414, Aug. 29-Sep. 2, 2016, Sanya, China, 3 pages.

3GPP TR 23.799 V1.1.0 (Oct. 2016), 3rd Generation Partnership Project; Technical Specification Group Services and System Aspects; Study on Architecture for Next Generation System (Release 14), Oct. 2016, 503 pages.

* cited by examiner

DATA CONNECTION METHOD, CONTROL-PLANE NODE, AND USER EQUIPMENT

CROSS-REFERENCE TO RELATED APPLICATIONS

This application is a continuation of International Application No. PCT/CN2017/093899, filed on Jul. 21, 2017, which claims priority to Chinese Patent Application No. 201611008023.2, filed on Nov. 16, 2016, The disclosures of the aforementioned applications are hereby incorporated by reference in their entireties.

TECHNICAL FIELD

This application relates to a mobile communications network, and in particular, to a data connection method, a control-plane node, and user equipment.

BACKGROUND

FIG. 1 is a schematic diagram of a logical architecture of a mobile communications network. User equipment (UE) accesses a network by using a local radio access point (AP), a control-plane node takes charge of connection management, security certification, mobility management, position management, and another function of the user equipment, and a user-plane node is responsible for forwarding user service data. It can be understood that the diagram of the logical architecture of the mobile communications network shown in FIG. 1 may correspond to a plurality of types of mobile communications network, for example, a next-generation mobile communications network, an Evolved Packet System (EPS), an evolved Long Term Evolution (eLTE) system, a second-generation mobile communications (2G) network, or a third-generation mobile communications (third-Generation) network. A next-generation mobile communications network is used as an example. For an access node in a next-generation air transportation system (Next-Gen), a control-plane node is corresponding to a control-plane function network element (CP) or (CCF), and a user-plane node is corresponding to a user-plane function network element (UP).

FIG. 2 is an architectural diagram of a network system actually deployed for an enterprise network. When user equipment is located outside a coverage area of an enterprise network, the user equipment accesses an external packet data network (PDN) by using a public-network user-plane node. However, when user equipment is located inside the coverage area of the enterprise network, the user equipment may access an internal network of an enterprise by using a local user-plane node in a local network, or may access an external packet data network by using a public-network user-plane node. That is, in the prior art, after user equipment enters a coverage area of an enterprise network, a data connection of the user equipment is anchored on a public-network user-plane node, but when the user equipment accesses an external packet data network by using the public-network user-plane node, a transmission delay of a service data packet is excessively long.

SUMMARY

Embodiments of this application provide a data connection method, a control-plane node, and user equipment, to provide a mechanism in which user equipment can access an external packet data network by using a local network, to be specific, by using a local user-plane node, thereby reducing a transmission delay of a service data packet.

In view of this, a first aspect of the embodiments of this application provides a data connection method. The method includes: sending, by a control-plane node, access information to user equipment, where the access information includes at least one access point name (APN) and Internet agent capability indication information for each access point name, and the access information is access information of a local network in an area in which the user equipment is currently located; receiving, by the control-plane node, a connection setup message sent by the user equipment, where the connection setup message includes a first access point name, and the first access point name is determined by the user equipment based on the Internet agent capability indication information; and determining, by the control-plane node, a corresponding local user-plane node based on the first access point name, and setting up a data connection from the user equipment to the local user-plane node.

In some possible implementations, Internet agent capability indication information for the first access point name indicates that the first access point name has an Internet agent capability.

In some possible implementations, the determining, by the control-plane node, a corresponding local user-plane node based on the first access point name is specifically: determining whether the first access point name is an access point name of the at least one access point name; and if the first access point name is an access point name of the at least one access point name, determining, by the control-plane node, the corresponding local user-plane node based on the first access point name.

In some possible implementations, before the sending, by a control-plane node, access information to user equipment, the method further includes: determining, by the control-plane node, the at least one access point name and the corresponding Internet agent capability indication information.

In some possible implementations, the determining, by the control-plane node, the at least one access point name and the corresponding Internet agent capability indication information is specifically: receiving, by the control-plane node, a position area identifier sent by an access node, where the position area identifier is sent by the access node after the access node receives an access request of the user equipment, and the position area identifier is a position area identifier corresponding to the area in which the user equipment is currently located; and determining, based on the position area identifier, the at least one access point name and the corresponding Internet agent capability indication information.

In some possible implementations, the determining, by the control-plane node based on the position area identifier, the at least one access point name and the corresponding Internet agent capability indication information is specifically: determining, by the control-plane node, all access point names and the Internet agent capability indication information that are corresponding to the position area identifier; and determining, based on all the access point names and the Internet agent capability indication information that are corresponding to the position area identifier, the at least one access point name and the corresponding Internet agent capability indication information.

In some possible implementations, the determining, by the control-plane node based on all the access point names and the Internet agent capability indication information that are corresponding to the position area identifier, the at least one access point name and the corresponding Internet agent capability indication information is specifically: determining, based on a carrier policy, the at least one access point name and the corresponding Internet agent capability indication information from all the access point names and the Internet agent capability indication information that are corresponding to the position area identifier.

In some possible implementations, the determining, by the control-plane node based on a carrier policy, the at least one access point name and the corresponding Internet agent capability indication information from all the access point names and the Internet agent capability indication information that are corresponding to the position area identifier is specifically: obtaining, based on the carrier policy, an access point name that allows access by the user equipment and corresponding Internet agent capability indication information; and using an access point name and Internet agent capability indication information for the access point name that are present in both the access point name that allows access by the user equipment and the corresponding Internet agent capability indication information, and all the access point names and the Internet agent capability indication information that are corresponding to the position area identifier, as the at least one access point name and the corresponding Internet agent capability indication information.

In some possible implementations, the determining, by the control-plane node based on all the access point names and the Internet agent capability indication information that are corresponding to the position area identifier, the at least one access point name and the corresponding Internet agent capability indication information is specifically: obtaining, by using a subscription-data center, all access point names subscribed to by the user equipment and corresponding Internet agent capability indication information; and determining the at least one access point name and the corresponding Internet agent capability indication information based on all the access point names subscribed to by the user equipment and the Internet agent capability indication information, and all the access point names and the Internet agent capability indication information that are corresponding to the position area identifier.

In some possible implementations, the determining, by the control-plane node, the at least one access point name and the corresponding Internet agent capability indication information based on all the access point names subscribed to by the user equipment and the Internet agent capability indication information, and all the access point names and the Internet agent capability indication information that are corresponding to the position area identifier is specifically: using an access point name and Internet agent capability indication information that are present in both all the access point names subscribed to by the user equipment and the Internet agent capability indication information, and all the access point names and the Internet agent capability indication information that are corresponding to the position area identifier, as the at least one access point name and the corresponding Internet agent capability indication information.

In some possible implementations, the determining, by the control-plane node based on all the access point names and the Internet agent capability indication information that are corresponding to the position area identifier, the at least one access point name and the corresponding Internet agent capability indication information is specifically: obtaining all access point names that allow the user equipment to access and corresponding Internet agent capability indication information based on a carrier policy, and obtaining all access point names subscribed to by the user equipment and corresponding Internet agent capability indication information by using a subscription-data center; and determining the at least one access point name and the corresponding Internet agent capability indication information based on all the access point names that allow the user equipment to access and the corresponding Internet agent capability indication information, all the access point names subscribed to by the user equipment and the corresponding Internet agent capability indication information, and all the access point names and the Internet agent capability indication information that are corresponding to the position area identifier.

In some possible implementations, the method further includes: receiving, by the control-plane node, a public-network connection delete request message sent by the user equipment, where the public-network connection delete request message is sent after the user equipment determines that a data connection, corresponding to the first access point name, to the local user-plane node is successfully set up and determines that the Internet agent capability indication information corresponding to the first access point name indicates that the first access point name has an Internet agent capability; and deleting, by the control-plane node, a data connection between the user equipment and a public-network user-plane node after receiving the public-network connection delete request message.

In some possible implementations, the method further includes: deleting, by the control-plane node, a data connection between the user equipment and a public-network user-plane node after determining that a data connection, corresponding to the first access point name, from the user equipment to the local user-plane node is successfully set up and that the Internet agent capability indication information corresponding to the first access point name indicates that the first access point name has an Internet agent capability.

It can be learned from above that, the control-plane node sends the access information to the user equipment, where the access information includes the at least one access point name and the Internet agent capability indication information for each access point name, and the access information is the access information of the local network in the area in which the user equipment is located currently; and the control-plane node receives the connection setup message sent by the user equipment, where the connection setup message includes the first access point name determined by the user equipment based on the Internet agent capability indication information, determines the corresponding local user-plane node based on the first access point name, and sets up the data connection from the user equipment to the local user-plane node. In this way, when the user equipment needs to access external packet-based network data, the user equipment may select an access point name corresponding to Internet agent capability indication information indicating that the access point name has an Internet agent capability, and send the access point name to the control-plane node, so that the control-plane node sets up a data connection between the user equipment and a local user-plane node corresponding to the access point name having the Internet agent capability. A service data packet may be directly bypassed from the local user-plane node in the local network when the user equipment accesses the external packet-based network data. This reduces a transmission delay of the service data packet when the user equipment accesses the external packet-based network data.

A second aspect of the embodiments of this application provides a data connection method. The method includes: receiving, by user equipment, access information sent by a control-plane node, where the access information includes at least one access point name and Internet agent capability indication information for each access point name, and the access information is access information of a local network in an area in which the user equipment is currently located; determining a first access point name from the at least one access point name based on the Internet agent capability indication information, where the first access point name is an access point name of the at least one access point name; and sending a connection setup message to the control-plane node, where the connection setup message includes the first access point name, so that the control-plane node determines a corresponding local user-plane node based on the first access point name, and sets up a data connection from the user equipment to the local user-plane node.

In some possible implementations, Internet agent capability indication information for the first access point name indicates that the first access point name has an Internet agent capability.

In some possible implementations, the method further includes: sending, by the user equipment, a public-network connection delete request message to the control-plane node after the user equipment sets up the data connection, corresponding to the first access point name, to the local user-plane node, so that the control-plane node deletes a data connection between the user equipment and the public-network user-plane node.

A third aspect of the embodiments of this application provides a control-plane node. The control-plane node has functions of implementing behaviors of the control-plane node in the foregoing method designs. The functions may be implemented by hardware, or may be implemented by hardware executing corresponding software. The hardware or software includes one or more modules corresponding to the functions. The module may be software and/or hardware.

In some possible implementations, a structure of the control-plane node includes a receiver, a transmitter, and a processor. The transmitter is configured to receive access information, where the access information includes at least one access point name and Internet agent capability indication information for each access point name, and the access information is access information of a local network in an area in which the user equipment is currently located; the receiver is configured to receive a connection setup message sent by the user equipment, where the connection setup message includes a first access point name, and the first access point name is determined by the user equipment based on the Internet agent capability indication information; and the processor is configured to: determine a corresponding local user-plane node based on the first access point name received by the receiver, and set up a data connection from the user equipment to the local user-plane node. The control-plane node may further include a memory. The memory is configured to: be coupled with the processor, and store a program instruction and data that are necessary for the control-plane node.

A fourth aspect of the embodiments of this application provides user equipment. The user equipment has functions of implementing behaviors of the user equipment in the foregoing method designs. The functions may be implemented by hardware, or may be implemented by hardware executing corresponding software. The hardware or software includes one or more modules corresponding to the functions. The module may be software and/or hardware.

In some possible implementations, a structure of the user equipment includes a receiver, a transmitter, and a processor. The receiver is configured to receive access information sent by a control-plane node, where the access information includes at least one access point name and Internet agent capability indication information for each access point name, and the access information is access information of a local network in an area in which the user equipment is currently located; the processor is configured to determine a first access point name from the at least one access point name based on the Internet agent capability indication information, where the first access point name is an access point name of the at least one access point name; and the transmitter is configured to send a connection setup message to the control-plane node, where the connection setup message includes the first access point name, so that the control-plane node determines a corresponding local user-plane node based on the first access point name, and sets up a data connection from the user equipment to the local user-plane node.

A fifth aspect of the embodiments of this application provides a computer storage medium. The computer storage medium stores program code, and the program code is used to instruct to execute the method in the first aspect or the second aspect.

It can be learned from the foregoing technical solutions that, in the embodiments of this application, the control-plane node sends the access information to the user equipment, where the access information includes the at least one access point name and the Internet agent capability indication information for each access point name, and the access information is the access information of the local network in the area in which the user equipment is located currently; and the control-plane node receives the connection setup message sent by the user equipment, where the connection setup message includes the first access point name determined by the user equipment based on the Internet agent capability indication information, determines the corresponding local user-plane node based on the first access point name, and sets up the data connection from the user equipment to the local user-plane node. In this way, when the user equipment needs to access external packet-based network data, the user equipment may select an access point name corresponding to Internet agent capability indication information indicating that the access point name has an Internet agent capability, and send the access point name to the control-plane node, so that the control-plane node sets up a data connection between the user equipment and a local user-plane node corresponding to the access point name having the Internet agent capability. A service data packet may be directly bypassed from the local user-plane node in the local network when the user equipment accesses the external packet-based network data. This reduces a transmission delay of the service data packet when the user equipment accesses the external packet-based network data.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person skilled in the art may derive other drawings from these accompanying drawings.

DESCRIPTION OF EMBODIMENTS

The embodiments of this application provide a data connection method, a control-plane node, and user equipment, to provide a mechanism in which user equipment can access an external packet data network by using a local network, to be specific, by using a local user-plane node, thereby reducing a transmission delay of a data packet when the user equipment accesses the external packet data network in the local network.

To make a person skilled in the art understand the technical solutions in this application better, the following clearly describes the technical solutions in the embodiments of this application with reference to the accompanying drawings in the embodiments of this application. Apparently, the described embodiments are merely some rather than all of the embodiments of this application. All other embodiments obtained based on the embodiments of this application shall fall within the protection scope of this application.

In the specification, claims, and accompanying drawings of this application, terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in orders other than the order illustrated or described herein. Moreover, terms "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The technical solutions of the embodiments of this application may be applied to various mobile communications network systems in a wireless cellular network, for example, a Global System for Mobile communications (GSM), a Code Division Multiple Access (CDMA) system, a Wideband Code Division Multiple Access (WCDMA) system, a general packet radio service (GPRS) system, a Long Term Evolution (LTE) system, a Universal Mobile Telecommunications System (UMTS), an EPS system, and a future 5G communications system. This is not specifically limited in this application.

Figure 3:
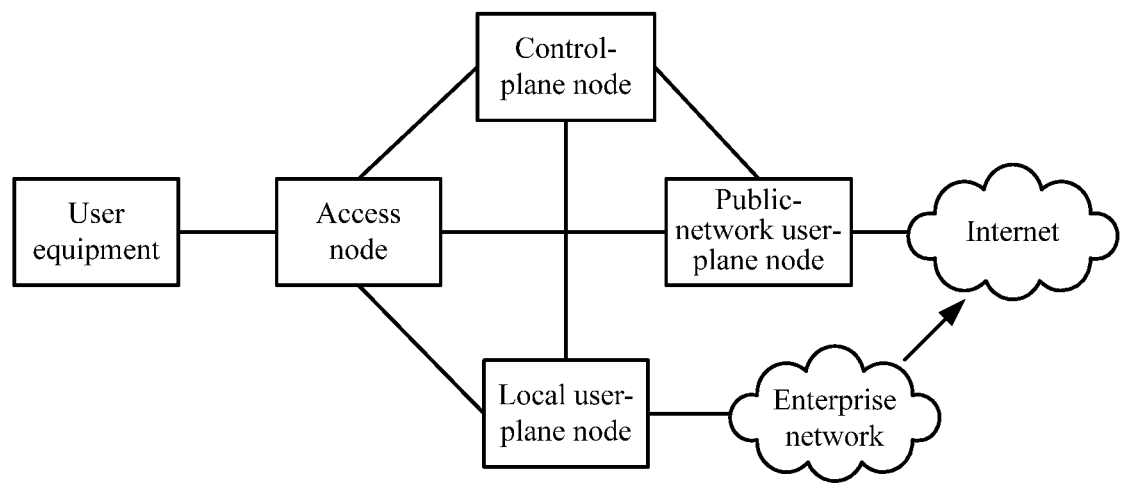
FIG. 3 is a schematic architectural diagram of a network system in a data connection method according to an embodiment of this application.

FIG. 3 is a schematic architectural diagram of a network system according to an embodiment of this application. The network system includes user equipment, an access node, a control-plane node, a public-network user-plane node, and a local user-plane node. A core of this embodiment of this application is as follows: The local user-plane node is deployed in a local network to provide access to an internal network; in addition, the local network provides an Internet agent capability, so that the user equipment can access an external packet data network by using the local network. Specifically, in this embodiment of this application, the control-plane node sends, to the user equipment, access information including at least one access point name and Internet agent capability indication information corresponding to each access point name, where the access information is access information of the local network in an area in which the user equipment is currently located; the user equipment selects a first access point name based on the Internet agent capability indication information; and finally the user equipment sends a connection setup message including the first access point name to the control-plane node. After receiving the connection setup message sent by the user equipment, the control-plane node determines whether the first access point name is an access point name of the at least one access point name sent by the control-plane node previously; and if the first access point name is not an access point name of the at least one access point name, the control-plane node rejects a connection setup request of the user equipment, or if the first access point name is an access point name of the at least one access point name, the control-plane node determines a corresponding local user-plane node based on the first access point name, and sets up a data connection from the user equipment to the local user-plane node. In this way, when the user equipment needs to access external packet-based network data, the user equipment may select an access point name that has an Internet agent capability and that is of the at least one access point name sent by the control-plane node, so that a service data packet of the user equipment can be directly bypassed from the local user-plane node in the local network. This reduces a transmission delay of the service data packet when the user equipment accesses the external packet-based network data, and also improves service experience of a user.

It should be noted that it can be learned from above that this embodiment of this application is applicable to various mobile communications network systems. A GPRS network system is used as an example. In the schematic architectural diagram of the network system shown in FIG. 3, the control-plane node is a serving GPRS support node (SGSN), the public-network user-plane node is a gateway GPRS support node (GGSN) in a public network, and the local user-plane node is a GGSN deployed in the local network. A next-generation mobile communications network is used as an example. In the schematic diagram of the architecture of the network system shown in FIG. 3, the control-plane node is a control-plane function network element, the public-network user-plane node is a user-plane function network element in a public network, and the local user-plane node is a user-plane function network element deployed in a local network.

Figure 4A:
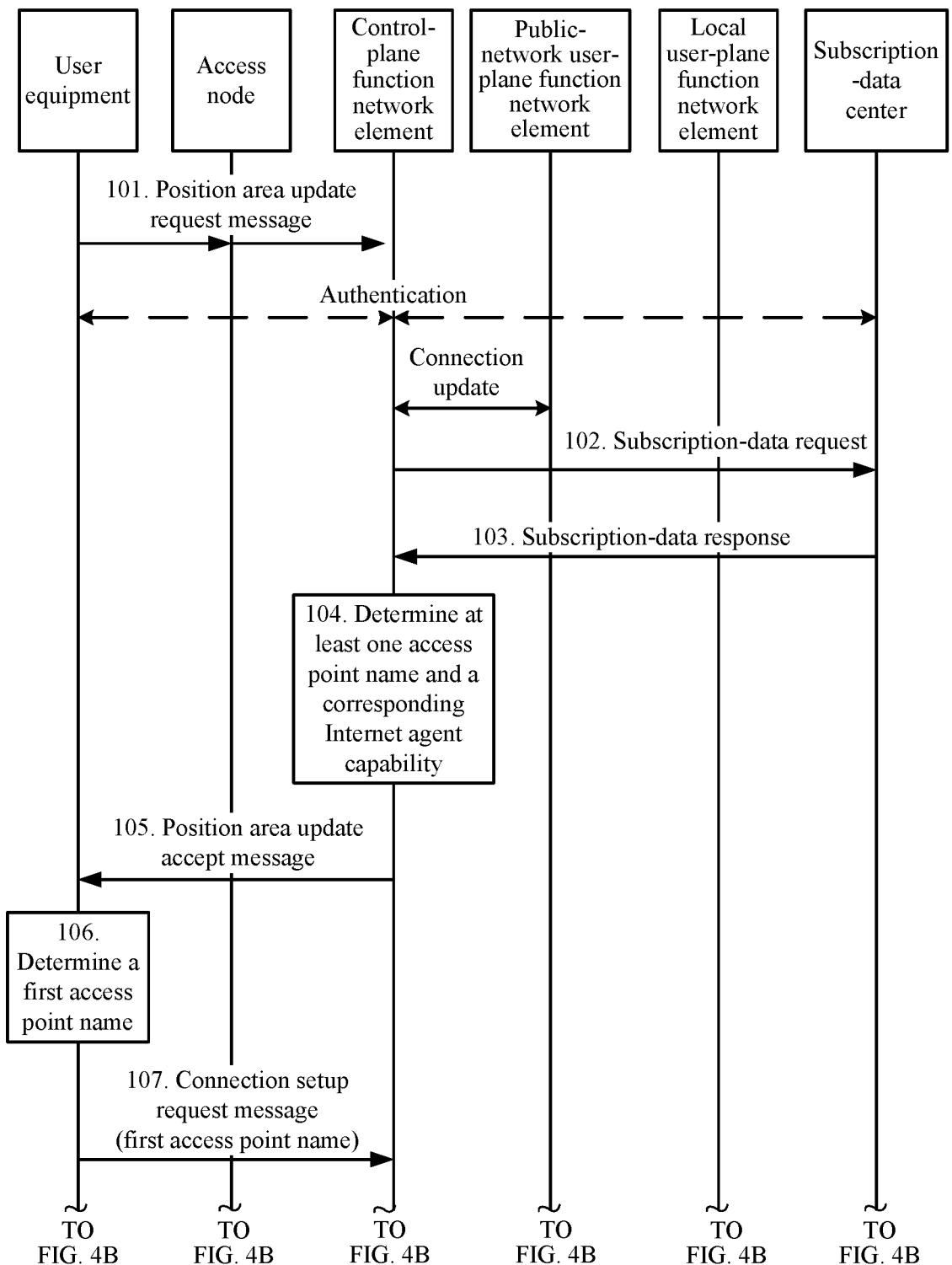
FIG. 4A and FIG. 4B are a schematic flowchart of an embodiment of a data connection method according to an embodiment of this application.
Figure 4B:
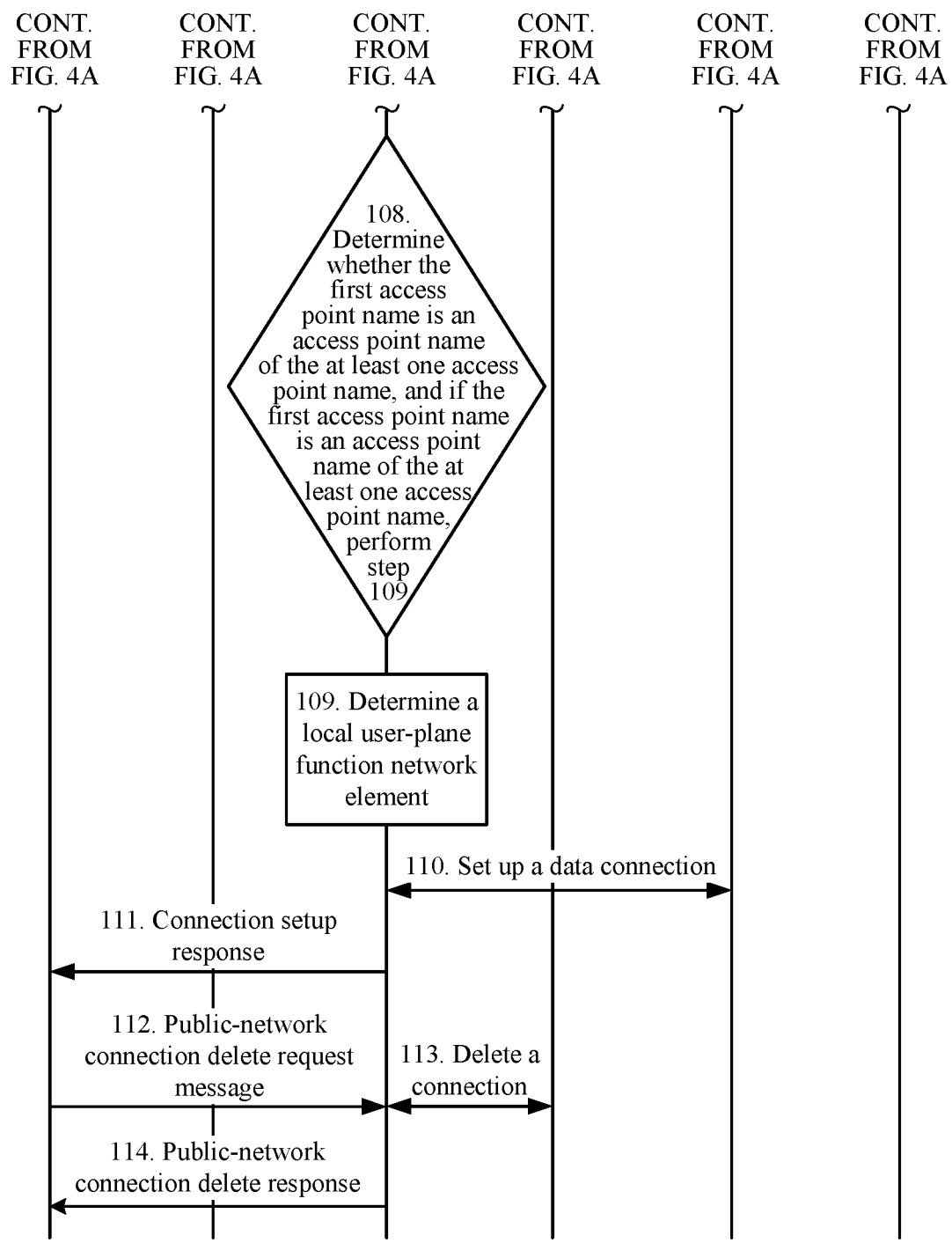

For ease of understanding, the following describes an embodiment of this application in detail by using a next-generation mobile communications network as an example. FIG. 4A and FIG. 4B are a schematic flowchart of an embodiment of a data connection method according to an embodiment of this application. The method includes the following steps.

101. User equipment sends a position area update request message to a control-plane function network element by using an access node.

After being connected to a local network, the user equipment initiates a position area update procedure due to a position area change, and sends the position area update request message to the control-plane function network element by using the access node. To be specific, after receiving a position area update request message of the user equipment, the access node forwards the position area update request message to the control-plane function network element, and the access node also notifies the control-plane function network element of a position area identifier of an area in which the user equipment is located currently.

It should be noted that in the foregoing scenario, the user equipment has been connected to a public network and then is moved to the local network. However, this embodiment of this application is also applicable to a scenario in which the user equipment is started after being connected to the local network. However, in this scenario, the user equipment needs to first initiate an attach procedure, that is, sending an attach request message to the control-plane function network element to complete the attach procedure. In this embodiment of this application, alternatively, after receiving the attach request message sent by the user equipment, the access node forwards the attach request message to the control function network element, and also notifies the control-plane function network element of the position area identifier of the area in which the user equipment is located currently. In other words, the access node sends, to the control-plane function network element, the position area identifier of the area in which the user equipment is located currently. When receiving an access request, that is, the attach request message or the position area update request, the access node may send the position area identifier of the area in which the user equipment is located currently to the control-plane function network element. This is not specifically limited herein.

Deployment of an enterprise network is used as an example. A local network in an enterprise campus and a public network outside the enterprise campus are in different network coverage areas and have different position area identifiers. When user equipment enters the enterprise campus from the outside of the enterprise campus, that is, the user equipment is moved to a coverage area of the local network from a coverage area of the public network, the user equipment initiates a position area update procedure due to a position area change.

Optionally, the control-plane function network element instructs a public-network user-plane function network element to update a data connection. The data connection is a service path from the user equipment to an external packet data network and is used to forward a data packet between the user equipment and an application server in the external packet data network. In a mobile communications network, the data connection is a data connection uniquely identified by an access point name and an Internet Protocol (IP) address of the user equipment. Before being connected to the local network, the user equipment accesses, in a public network by using the user-plane function network element, an external packet data network provided by a mobile communications network carrier. Data connection information of the user equipment in the public-network user-plane function network element is updated in this step, for example, the current position area identifier of the user equipment and a user-plane data packet forwarding address of a new access node. This step is optional.

102. The control-plane function network element sends a subscription-data request to a subscription-data center.

It should be noted that in this step of sending, by the control-plane function network element, a subscription-data request to a subscription-data center, based on actual application, there are the following two cases.

In a first case, the control-plane function network element in this step is a control-plane function network element newly accessed by the user equipment after the user equipment is connected to the local network from the public network. That is, if the control-plane function network element changes after the user equipment is connected to the local network, the control-plane function network element is no longer a control-plane function network element accessed in the public network before the user equipment is connected to the local network. In this case, the newly accessed the control-plane function network element sends the subscription-data request to the subscription-data center, to obtain subscription data of the user equipment.

In a second case, the control-plane function network element in this step is a control-plane function network element accessed by the user equipment in the public network before the user equipment is connected to the local network from the public network. That is, if the control-plane function network element does not change after the user equipment is connected to the local network, when the user equipment accesses the control-plane function network element in the public network, the control-plane function network element can send a subscription-data request to the subscription-data center, to obtain the subscription data of the user equipment.

103. The subscription-data center returns a subscription-data response to the control-plane function network element.

The subscription-data response carries the subscription data of the user equipment. The subscription data includes all access point names corresponding to the local network that are subscribed to by the user equipment and Internet agent capability indication information corresponding to all the subscribed access point names.

For example, if an APN name is enterprise1.mnc012.mcc345.gprs, and an Internet agent capability is corresponding to Yes, it indicates that the access point has the Internet agent capability. For another example, an APN name is enterprise2.mnc023.mcc456.org, and an Internet agent capability is corresponding to No, it indicates that the access point name has no Internet agent capability.

It should be noted that the foregoing examples are used only for description herein. In this embodiment of this application, there may be a plurality of manners for indicating an Internet agent capability indication information for an access point name. This is not specifically limited. There may be the following manners:

1. The subscription data carries Internet agent capability indication information corresponding to an access point name, where the Internet agent capability indication information indicates that the access point name has no Internet agent capability. No limitation is imposed on a case that there is an Internet agent capability. A case may be: The subscription data carries no Internet agent capability indication information corresponding to the access point name, and in this case, the access point name has an Internet agent capability.

2. The subscription data carries an Internet agent capability indication information corresponding to an access point name, where the Internet agent capability indication indicates that the access point name has an Internet agent capability. No limitation is imposed on a case that there is no Internet agent capability. A case may be: The subscription data carries no Internet agent capability indication information corresponding to the access point name, and in this case, the access point name has no Internet agent capability.

3. The subscription data carries Internet agent capability indication information corresponding to an access point name. The Internet agent capability indication information has two meanings, that is, indicating that the access point name has an Internet agent capability or the access point name has no Internet agent capability. It can be understood that the foregoing example is corresponding to this manner. "YES" is used to indicate that the corresponding access point name has an Internet agent capability. "NO" is used to indicate that the corresponding access point name has no Internet agent capability.

It should be noted that before obtaining the subscription data of the user equipment, the control-plane function network element may further perform authentication on the user equipment first to determine security of the user equipment. Details are not described herein.

104. The control-plane function network element determines access information, where the access information includes at least one access point name and Internet agent capability indication information corresponding to each access point name.

In other words, the control-plane function network element determines the at least one access point name and the Internet agent capability indication information corresponding to each of the at least one access point name.

The access information is access information of the local network in an area in which the user equipment is located currently, and is to be sent finally by the control-plane function network element to the user equipment. There may be a plurality of specific manners for determining the access information by the control-plane function network element. The following describes several manners.

In a first manner, in this embodiment of this application, the control-plane function network element determines the access information based on the subscription data, a carrier policy, and the position area identifier of the user equipment. Specifically, based on all access point names corresponding to the local network that are subscribed to by the user equipment and corresponding Internet agent capability indication information that are in the subscription data, all access point names corresponding to the local network that allow access by the user equipment and corresponding Internet agent capability indication information that are in the carrier policy, and all access point names corresponding to the local network and Internet agent capability indication information for the access point names that are corresponding to the position area identifier of the area in which the user equipment is located currently, the control-plane function network element determines the access information to be sent to the user equipment finally. The carrier policy may be configured based on an actual application case, and usually allows the user equipment to access one or more access point names corresponding to the local network. This is not specifically limited herein. For example, the carrier policy allows the user equipment to access an APN enterprise1.mnc012.mcc345.gprs with an Internet agent capability corresponding to Yes, and an APN enterprise3.mnc023.mcc456.org with an Internet agent capability corresponding to No.

As listed in Table 1, when an access point name, subscribed to by the user equipment, corresponding to the local network and corresponding Internet agent capability indication information that are obtained from the subscription-data center, an access point name corresponding to the local network and corresponding Internet agent capability indication information that are in the carrier policy, and an access point name and Internet agent capability indication information for the access point name that are corresponding to a position area identifier of the area in which the user equipment is located currently are absolutely the same, the user equipment is allowed to access the access point name, otherwise, the user equipment is not allowed to access the access point name.

TABLE 1

| Subscription data | Carrier policy | Local network corresponding to a position area identifier | Whether access to user equipment is allowed |
|---|---|---|---|
| APN: enterprise1.mnc012.mcc345.gprs; Internet agent capability: Yes | APN: enterprise1.mnc012.mcc345.gprs; Internet agent capability: Yes | APN: enterprise1.mnc012.mcc345.gprs; Internet agent capability: Yes | YES |
| APN: enterprise2.mnc023.mcc456.org; Internet agent capability: No | | | NO |
| | | APN: enterprise3.mnc023.mcc456.org; Internet agent capability: No | NO |

As described in Table 2, for an access point name in the carrier policy, whether to omit subscription data may be determined. For a record in which subscription data can be omitted, even if the user equipment does not carry out subscription, the user equipment is also allowed to access an access point name provided that the access point name and the Internet agent capability indication information for the access point name that are corresponding to the position area identifier of the area in which the user equipment is located currently are the same as those in the subscription data. For a record in which subscription data cannot be omitted, when an access point name subscribed to by the user equipment and corresponding Internet agent capability indication information that are in the subscription data, an access point name and corresponding Internet agent capability indication information that are in the carrier policy, and an access point name and Internet agent capability indication information for the access point name that are corresponding to the position area identifier of the area in which the user equipment is located currently need to be absolutely the same, the user equipment is allowed to access the access point name, otherwise, the user equipment is not allowed to access the access point name.

In a third manner, the control-plane function network element determines, based on the subscription data and the position area identifier of the user equipment, the access information to be sent to the user equipment finally. Specifically, the control-plane function network element uses an access point name and corresponding Internet agent capa-

TABLE 2

| Subscription data | Carrier policy | Local network corresponding to a position area identifier | Whether access to user equipment is allowed |
|---|---|---|---|
| APN: enterprise1.mnc012.mcc345.gprs; Internet agent capability: Yes; | APN: enterprise1.mnc012.mcc345.gprs; Internet agent capability: Yes; Whether to omit subscription data: NO | | NO |
| APN: enterprise2.mnc023.mcc456.org; Internet agent capability: No | | | NO |
| | APN: enterprise3.mnc023.mcc456.org; Internet agent capability: No; Whether to omit subscription data: YES | APN: enterprise3.mnc023.mcc456.org; Internet agent capability: No | YES |

An access point name that is corresponding to the local network and that allows access by the user equipment and Internet agent capability indication information are determined based on Table 1 or Table 2. To be specific, the control-plane function network element determines, based on the subscription data, the carrier policy, and the position area identifier of the user equipment, the access point name that is corresponding to the local network and that allows access by the user equipment and the corresponding Internet agent capability indication information, that is, the access information.

It should be noted that in the foregoing example, the control-plane function network element determines, based on the subscription data, the carrier policy, and the position area identifier of the user equipment, the access information that needs to be sent to the user equipment. However, during actual application, not both the subscription data and the carrier policy of the user equipment are required. The access information that needs to be sent to the user equipment may be determined only by depending on the subscription data and the position area identifier of the user equipment, or only by using the carrier policy and the position area identifier. Certainly, the control-plane function network element may alternatively determine, only by depending on the position area identifier of the user equipment, the access information that needs to be sent to the user equipment. This is not specifically limited herein. The following provides descriptions by using examples one by one.

In a second manner, the control-plane function network element determines, based on the position area identifier of the user equipment, the access information that needs to be sent to the user equipment. Specifically, the control-plane function network element uses all access point names and Internet agent capability indication information that are corresponding to the position area identifier of the user equipment, as the access information to be sent to the user equipment.

bility indication information that are present in both an access point name and corresponding Internet agent capability indication information that are in the subscription data, and an access point name and Internet agent capability indication information that are corresponding to the position area identifier, as the access information to be sent to the user equipment finally.

In a fourth manner, the control-plane function network element determines, based on the carrier policy and the position area identifier, the access information to be sent to the user equipment finally. Specifically, the control-plane function network element uses an access point name and Internet agent capability indication information that are present in both all access point names that the carrier policy allows the user equipment to access and corresponding Internet agent capability indication information, and an access point name and Internet agent capability indication information that are corresponding to the position area identifier, as the access information to be sent to the user equipment finally. For example, if an access point name that the carrier policy allows the user equipment to access and an Internet agent capability indication are that the APN is enterprise1.mnc012.mcc345.gprs and the Internet agent capability is corresponding to Yes, and similarly, if an access point name corresponding to the position area identifier of the user equipment and an Internet agent capability of the access point name are that the APN is enterprise1.mnc012.mcc345.gprs and the Internet agent capability is corresponding to Yes, the access point name and the Internet agent capability indication are used as the access information to be sent to the user equipment finally.

It should be noted that the carrier policy may be a local carrier policy configured on the control-plane function network element, for example, preconfigured on the control-plane function network element by an operation and maintenance side. Alternatively, the carrier policy may be obtained by the control-plane function network element from another network element, for example, from a subscription-data center or a policy function network element in a network system. This is not specifically limited herein.

In addition, it should be noted that, in this embodiment of this application, the control-plane function network element determines, based on the current position area identifier, included in step 101, of the user equipment, the access point name and the Internet agent capability for the access point name that are corresponding to the position area identifier. There may be one or more local networks in a position area corresponding to the position area identifier. Each local network is corresponding to one or more access point names and Internet agent capability indication information for the one or more access point names. A correspondence between the position area identifier, the access point name, and the Internet agent capability indication information for the access point name may be configured on the control-plane function network element, for example, preconfigured by an operation and maintenance side on the control-plane function network element. Alternatively, the correspondence may be obtained by the control-plane function network element from another network element, for example, from a subscription-data center or a policy function network element in a network system. This is not specifically limited herein.

105. The control-plane function network element sends a position area update accept message to the user equipment.

The position area update accept message includes the access information determined by the control-plane function network element in step 104.

As described in the foregoing example, it can be understood that if the control-plane function network element finally determines an access point name that is an APN enterprise1.mnc012.mcc345.gprs and whose Internet agent capability is corresponding to Yes, as the access information to be sent to the user equipment, the position area update accept message includes the access point name and the Internet agent capability indication information for the access point name. There may be a plurality of manners for indicating the Internet agent capability indication information. Details are the same as the descriptions in step 103.

106. The user equipment determines a first access point name.

After receiving the position area update accept message, that is, after receiving the access information sent by the control-plane function network element, the user equipment selects a proper access point name based on Internet agent capability indication information corresponding to each access point name in the access information.

For example, user equipment A enters a campus of an enterprise A and finds that an access point name A has an Internet agent capability; in this case, the user equipment A selects the access point name. For another example, user equipment B is in a coffee bar and finds that the coffee bar provides a local network, but an access point name B corresponding to the local network does not provide an Internet agent capability, the user equipment does not select the access point name B. For another example, user equipment C is in a library, an access point name C corresponding to a local network of the library does not provide an Internet agent capability, and user equipment C needs to access the internal network provided by the library, to query for a book; in this case, the user equipment C selects the access point name. This is not specifically limited herein.

It should be noted that the user equipment may preferentially select, according to a requirement of the user equipment, an access point name that has an Internet agent capability. If access point names selectable by the user equipment do not include a proper access point name, for example, an Internet agent capability does not meet a requirement of the user equipment or none of the access point names has an Internet agent capability, the user equipment may alternatively not select any access point name, and subsequent steps do not need to be performed.

Specifically, the access information sent by the control-plane function network element to the user equipment may be displayed on the user equipment, and a user who holds the user equipment manually selects one of the access point names according to a requirement of the user on an Internet agent capability. Alternatively, there may some option settings on the user equipment, for example, preferentially selecting an access point name having an Internet agent capability or selecting only an access point name having an Internet agent capability. After receiving the access information, the user equipment determines, based on the option settings, an access point name that meets a requirement.

107. The user equipment sends a connection setup request message to the control-plane function network element.

The connection setup request message includes a first access point name selected by the user equipment.

108. The control-plane function network element determines whether the first access point name is an access point name of the at least one access point name included in the access information sent by the control function network element, and if the first access point name is an access point name of the at least one access point name, performs step 109.

In other words, if determining that the first access point name is an access point name of the at least one access point name determined by the control-plane function network element in step 104, the control-plane function network element performs step 109.

It should be noted that the user equipment may not select an access point name based on the received access information, and therefore the control-plane function network element needs to perform such determining. If determining that the first access point name is not included in the at least one access point name sent by the control function network element, the control-plane function network element rejects a connection setup request of the user equipment.

109. The control-plane function network element determines a corresponding local user-plane function network element based on the first access point name.

In this embodiment of the present application, when receiving the connection setup request message sent by the user equipment, the control-plane function network element determines the local user-plane function network element corresponding to the first access point name.

The control-plane function network element may use a plurality of methods to determine the corresponding local user-plane function network element based on the first access point name. For example, the first access point name is used to query another network element such as a domain name system for an address of the local user-plane function network element corresponding to the access point name, so as to determine the local user-plane function network element. For another example, an address of the local user-plane function network element corresponding to the access point is determined based on the access point name and a local configuration of the control-plane function network element, so as to determine the local user-plane function network element. A specific method for determining the local user-plane function network element is not limited herein.

110. The control-plane function network element sets up a data connection from the user equipment to the local user-plane function network element.

In this embodiment of this application, after determining the local user-plane function network element corresponding to the first access point name, the control-plane function network element sets up a data connection from the user equipment to the local user-plane function network element.

111. The control-plane function network element sends a connection setup response to the user equipment.

After the data connection between the local user-plane function network element and the user equipment is successfully set up, the control-plane function network element sends the connection setup response to the user equipment. For a data connection corresponding to an access point name having an Internet agent capability, the user equipment may access the external packet data network by using a local user-plane function network element. That is, the service data packet of the user equipment may be directly bypassed from the local user-plane function network element of the local network, to reduce a transmission delay of the service data packet when the user equipment accesses external packet-based network data, and improve user service experience.

112. The user equipment sends a public-network connection delete request message to the control-plane function network element.

After the user equipment determines that the data connection that is corresponding to the access point name and that is set up on the local user-plane function network element has an Internet agent capability, an original connection set up by the user equipment in the public network, to be specific, the connection to the public-network user-plane function network element may be released. Specifically, after receiving the connection setup response sent by the control-plane function network element, the user equipment may send the public-network connection delete request message to the control-plane function network element. The user equipment instructs the control-plane function network element to delete the data connection between the user equipment and the public-network user-plane function network element.

113. The control-plane function network element deletes a data connection between the user equipment and a public-network user-plane function network element.

After receiving the public-network connection delete request message sent by the user equipment, the control-plane function network element deletes the data connection between the user equipment and the public-network user-plane function network element.

It should be noted that in the foregoing manner, the user equipment proactively requests to delete the data connection between the user equipment and the control-plane function network element in the public network. During actual application, after the control-plane function network element determines that a network connection between the user requirement and the local user-plane function network element is successfully set up and determines that the connection has an Internet agent capability, the control-plane function network element proactively deletes the data connection between the public-network user-plane function network element and the user equipment. This is not specifically limited herein.

114. The control-plane function network element sends a public-network connection delete response to the user equipment.

After the control-plane function network element deletes the connection between the public-network user-plane function network element and the user equipment, the control-plane function network element sends a public-network connection delete response to the user equipment to notify that the data connection between the user equipment and the public-network user-plane function network element has been deleted.

It should be noted that, in this embodiment of this application, the control-plane function network element sends the finally determined access information to the user equipment by using the position area update accept message. However, during specific implementation, the control-plane function network element may alternatively provide a notification by using another separate signaling message. For example, the signaling message may be an EPS Mobility Management (EMM) message used by a network side to notify a network name and time zone information, or another separately defined message. The signaling message may be sent in a position area update/attach procedure, or may be sent to the user equipment after a position area update/attach procedure ends. This is not specifically limited herein.

In still another manner, the user equipment may proactively obtain an access point name corresponding to the local network of the area in which the user equipment is located and Internet agent capability indication information corresponding to the access point name. After the user equipment enters an enterprise campus, changes in a position area, and initiates position area update. After the position area update procedure succeeds, the user equipment sends an access information request message to the control-plane function network element. The access information request message is used to obtain an access point name in a current position area and a corresponding Internet agent capability indication information. For the following procedures, refer to steps 106 to 114. Details are not repeated herein.

In addition, it should be noted that it can be learned from the foregoing descriptions that this embodiment of this application is described by using the next-generation network as an example, but is not limited to a single system actually. The method in this application may also be applied to another network system. This application is used in different network system architectures. Details are not described herein one by one.

It can be learned that the control-plane node sends the access information to the user equipment, where the access information includes the at least one access point name and the Internet agent capability indication information for each access point name, and the access information is the access information of the local network in the area in which the user equipment is located currently; and the control-plane node receives the connection setup message sent by the user equipment, where the connection setup message includes the first access point name determined by the user equipment based on the Internet agent capability indication information, determines the corresponding local user-plane node based on the first access point name, and sets up the data connection from the user equipment to the local user-plane node. In this way, when the user equipment needs to access the external packet-based network data, the user equipment may select an access point name corresponding to Internet agent capability indication information indicating that the access point name has an Internet agent capability, and send the access point name to the control-plane node, so that the control-plane node sets up a data connection between the user equipment and a local user-plane node corresponding to the access point name having the Internet agent capability.

A service data packet may be directly bypassed from the local user-plane node in the local network when the user equipment accesses the external packet-based network data. This reduces a transmission delay of the service data packet when the user equipment accesses the external packet-based network data.

Figure 5:
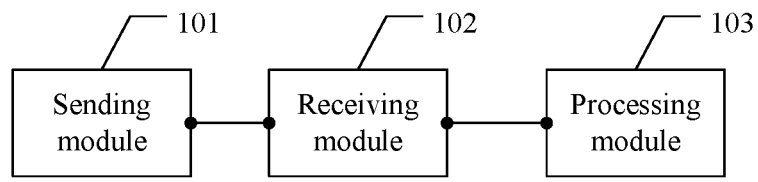
FIG. 5 is a schematic structural diagram of an embodiment of a control-plane node according to an embodiment of this application.

The foregoing describes the data connection method according to this embodiment of this application. The following describes a control-plane node according to an embodiment of this application. FIG. 5 is a schematic structural diagram of an embodiment of a control-plane node according to an embodiment of this application. The control-plane node includes a sending module 101, a receiving module 102, and a processing module 103.

The sending module 101 is configured to send access information to user equipment. The access information includes at least one access point name and Internet agent capability indication information for each access point name, and the access information is access information of a local network in an area in which the user equipment is currently located.

The receiving module 102 is configured to receive a connection setup message sent by the user equipment. The connection setup message includes a first access point name, and the first access point name is determined by the user equipment based on the Internet agent capability indication information.

The processing module 103 is configured to: determine a corresponding local user-plane node based on the first access point name received by the receiving module, and set up a data connection from the user equipment to the local user-plane node.

Figure 6:
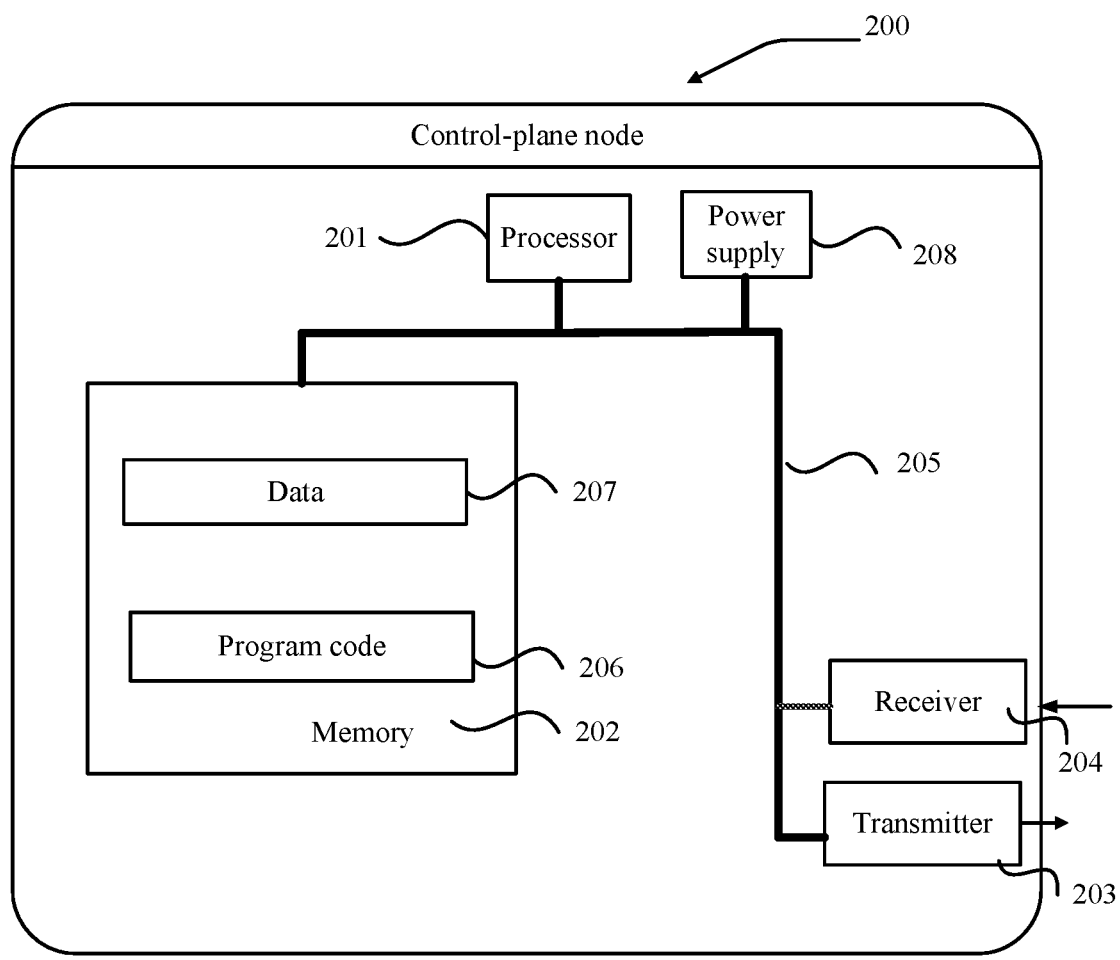
FIG. 6 is a schematic structural diagram of another embodiment of a control-plane node according to an embodiment of this application.

It should be noted that the foregoing describes the control-plane node in this embodiment of this application from a perspective of a modular function entity. The following describes a control-plane node in an embodiment of this application from a perspective of hardware processing. FIG. 6 is a schematic structural diagram of another embodiment of a control-plane node according to an embodiment of this application. The control-plane node 200 includes a processor 201, a memory 202, a transmitter 203, and a receiver 204. The processor 201, the memory 202, the transmitter 203, and the receiver 204 are interconnected by using a bus 205.

The processor 201 may be a central processing unit (CPU), a network processor NP), or a combination of a CPU and an NP. The processor may further include a hardware chip, and may be specifically an application-specific integrated circuit (ASIC), a programmable logic device PLD), or a combination thereof. In addition, the PLD may be a complex programmable logic device (CPLD), a field-programmable logic gate array (FPGA), a generic array logic (GAL), or any combination thereof. No limitation is imposed thereon in this application.

The memory 202 may include a volatile memory (volatile memory), for example, a random access memory (RAM). The memory may alternatively include a non-volatile memory (non-volatile memory), for example, a flash memory (flash memory), a hard disk drive (HDD), or a solid-state drive (SSD). The memory may alternatively include a combination of the foregoing types of memories.

Figure 1:
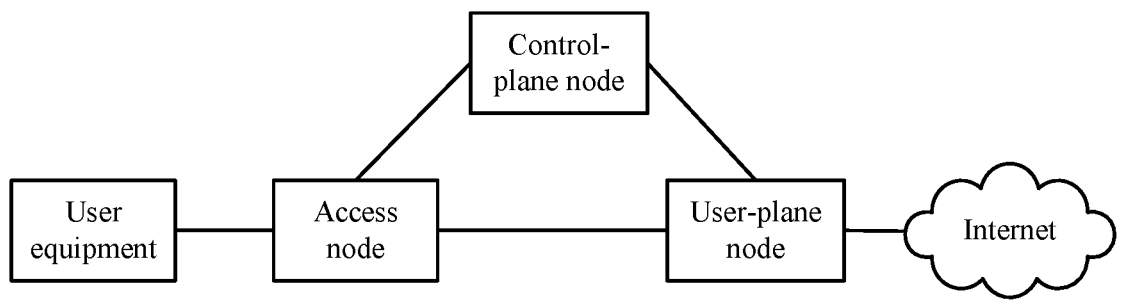
FIG. 1 is a schematic diagram of a logical architecture of a mobile communications network.
Figure 2:
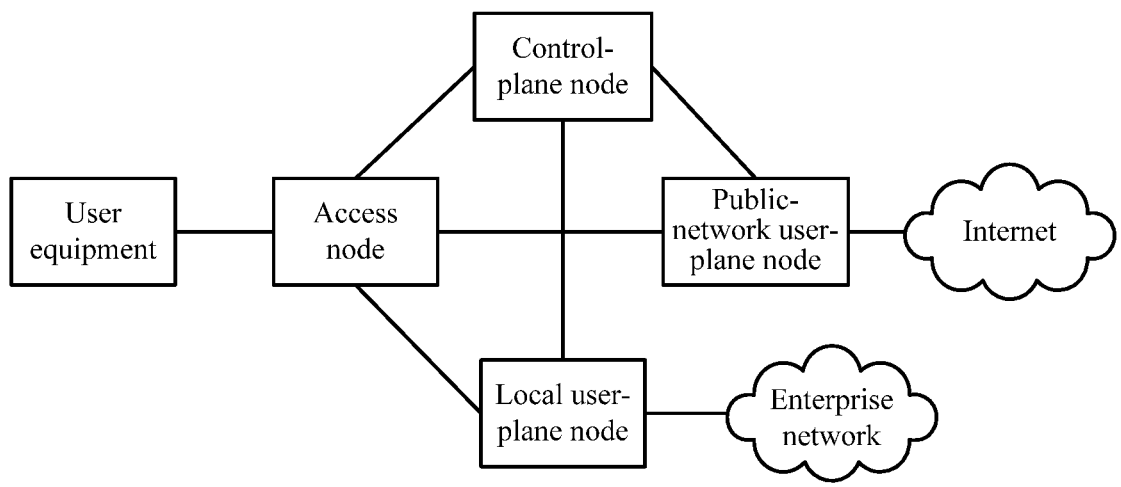
FIG. 2 is a schematic architectural diagram of a network system deployed for an enterprise network in the prior art.

The bus 205 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

The transmitter 203 is configured to send an instruction or data used by the control-plane node in the foregoing corresponding method embodiment. The receiver 204 is configured to receive the instruction or data used by the control-plane node in the foregoing corresponding method embodiment.

The memory 202 may store program code 206, and may further store the data 207 used by the control-plane node in the foregoing method embodiment. For example, the data 207 may be the access information in the foregoing method embodiment, or the like. The processor 201 may invoke the program code 206 stored in the memory, to perform the corresponding steps in the foregoing method embodiment, so that the control-plane node can finally implement the behaviors or functions of the control-plane node in the foregoing method embodiment.

It should be noted that the control-plane node 200 may further include a power supply 208. It should be noted that the structure of the control-plane node shown in FIG. 6 constitutes no limitation on composition of the control-plane node, and may include more or fewer components than those shown in the figure, or a combination of some components, or components disposed differently. Details are not described herein one by one.

In this embodiment of this application, the steps performed by the control-plane node may be based on the schematic structural diagram of the control-plane node shown in FIG. 6. For details, refer to a corresponding process of the control-plane node in the foregoing method embodiment, and details are not repeated herein.

Figure 7:
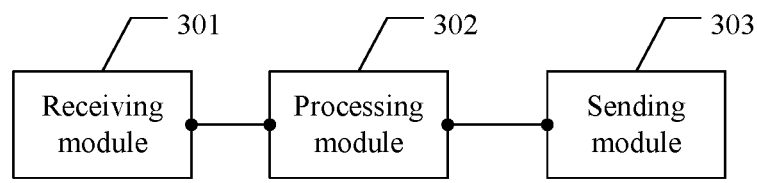
FIG. 7 is a schematic structural diagram of an embodiment of user equipment according to an embodiment of this application.

The following describes user equipment according to an embodiment of this application. FIG. 7 is a schematic structural diagram of an embodiment of user equipment according to an embodiment of this application. The user equipment includes a receiving module 301, a processing module 302, and a sending module 303.

The receiving module 301 is configured to receive access information sent by a control-plane node. The access information includes at least one access point name and Internet agent capability indication information for each access point name, and the access information is access information of a local network in an area in which the user equipment is currently located.

The processing module 302 is configured to determine a first access point name from the at least one access point name based on the Internet agent capability indication information. The first access point name is an access point name of the at least one access point name.

The sending module 303 is configured to send a connection setup message to the control-plane node, where the connection setup message includes the first access point name, so that the control-plane node determines a corresponding local user-plane node based on the first access point name, and sets up a data connection from the user equipment to the local user-plane node.

Figure 8:
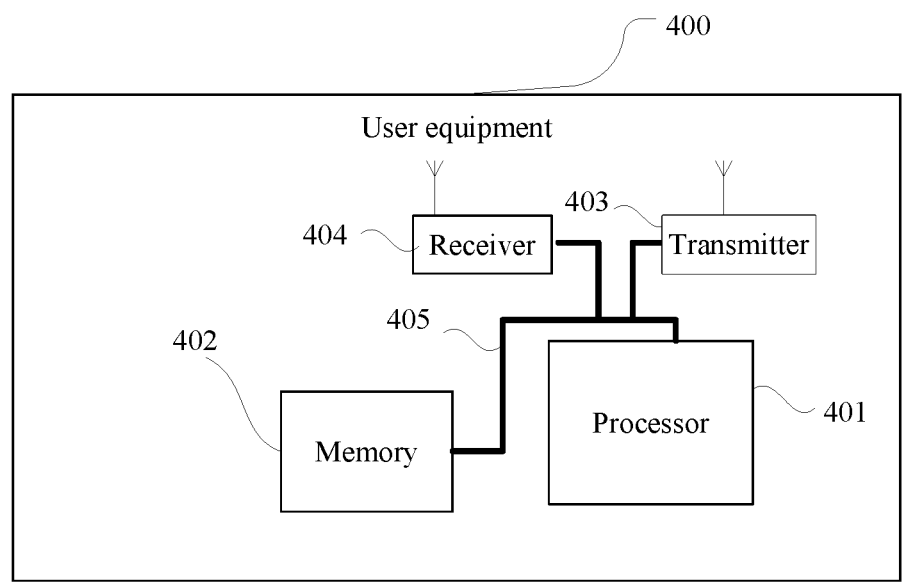
FIG. 8 is a schematic structural diagram of another embodiment of user equipment according to an embodiment of this application.

The foregoing describes the user equipment in this embodiment of this application from a perspective of a modular function. The following describes user equipment 400 in an embodiment of this application from a perspective of hardware processing. FIG. 8 is a schematic structural diagram of user equipment according to this application. The user equipment 400 includes a processor 401, a memory 402, a transmitter 403, and a receiver 404. The processor

401, the memory 402, the transmitter 403, and the receiver 404 are interconnected by using a bus 405.

The transmitter 403 is configured to send an instruction or data used by the corresponding user equipment in the foregoing corresponding method embodiment. The receiver 404 is configured to receive the instruction or data used by the corresponding user equipment in the foregoing corresponding method embodiment.

The memory 402 is configured to store signaling or data in the foregoing method embodiment and related program code. When the related program code is executed by the processor 401, the corresponding method or functions of the user equipment in the foregoing embodiment of this application may be implemented. A person skilled in the art may understand that the structure of the user equipment shown in FIG. 8 does not constitute any limitation to the user equipment; and may include components more or fewer than those shown in the figure, or a combination of some components, or components disposed differently. Details are not described herein one by one.

The steps performed by the user equipment in this embodiment may be based on the schematic structural diagram of the user equipment shown in FIG. 8. For details, refer to the corresponding execution process in the foregoing embodiments, and details are not repeated herein.

The processor 401 may be a CPU, an NP, or a combination of a CPU and an NP. The processor may further include a hardware chip, and may be specifically an ASIC, a PLD, or a combination thereof. In addition, the PLD may be a CPLD, an FPGA, a GAL, or any combination thereof. No limitation is imposed thereon in this application.

The memory 402 may include a volatile memory, for example, a RAM. The memory may alternatively include a non-volatile memory, for example, a flash memory, a hard disk drive, or a solid-state drive. The memory may alternatively include a combination of the foregoing types of memories. The bus 405 may be a PCI bus, an EISA bus, or the like. The bus may be classified into an address bus, a data bus, a control bus, and the like. For ease of representation, only one thick line is used to represent the bus in FIG. 8.

It can be learned that a control-plane node sends access information to the user equipment, where the access information includes at least one access point name and Internet agent capability indication information for each access point name, and the access information is access information of a local network in an area in which the user equipment is located currently; and the control-plane node receives a connection setup message sent by the user equipment, where the connection setup message includes a first access point name determined by the user equipment based on Internet agent capability indication information, determines a corresponding local user-plane node based on the first access point name, and sets up a data connection from the user equipment to the local user-plane node. In this way, when the user equipment needs to access external packet-based network data, the user equipment may select an access point name corresponding to Internet agent capability indication information indicating that the access point name has an Internet agent capability, and send the access point name to the control-plane node, so that the control-plane node sets up a data connection between the user equipment and a local user-plane node corresponding to the access point name having the Internet agent capability. A service data packet may be directly bypassed from the local user-plane node in the local network when the user equipment accesses the external packet-based network data. This reduces a transmission delay of the service data packet when the user equipment accesses the external packet-based network data.

It should be noted that for details of the steps or functions performed by the control-plane node and the user equipment in the embodiments of this application, refer to the corresponding processes in the foregoing method embodiment, and details are not repeated herein.

In the several embodiments provided in this application, it should be understood that the disclosed system, module, and method may be implemented in other manners. For example, the described apparatus embodiment is merely an example. For example, the module division is merely logical function division, or may be other division during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position or may be distributed on a plurality of network units. Some or all of the units may be selected based on actual requirements to achieve the objectives of the solutions of the embodiments.

In addition, function modules in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated module is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method of data connection, comprising:
sending, by a control-plane node to user equipment, access information comprising at least one access point name and Internet agent capability indication information for each access point name, the access information being access information of a local network in an area in which the user equipment is currently located;

receiving, by the control-plane node from the user equipment, a connection setup message comprising a first access point name, the first access point name being determined by the user equipment based on the Internet agent capability indication information;

determining, by the control-plane node, whether the first access point name is an access point name of the at least one access point name; and in response to the first access point name being an access point name of the at least one access point name, determining, by the control-plane node, a corresponding local user-plane node based on the first access point name, and setting up a data connection from the user equipment to the local user-plane node.

2. The method according to claim 1, wherein the Internet agent capability indication information for the first access point name indicates that the first access point name has an Internet agent capability.

3. The method according to claim 1, wherein before the sending, by the control-plane node, the access information to the user equipment, the method further comprises:

determining, by the control-plane node, the at least one access point name and the corresponding Internet agent capability indication information.

4. The method according to claim 3, wherein the determining, by the control-plane node, the at least one access point name and the corresponding Internet agent capability indication information comprises:

receiving, by the control-plane node, a position area identifier from an access node, and the position area identifier is a position area identifier corresponding to the area in which the user equipment is currently located;

determining, by the control-plane node, all access point names and the Internet agent capability indication information that are corresponding to the position area identifier; and determining, by the control-plane node based on all the access point names and the Internet agent capability indication information that are corresponding to the position area identifier, the at least one access point name and the corresponding Internet agent capability indication information.

5. The method according to claim 4, wherein the determining, by the control-plane node based on all the access point names and the Internet agent capability indication information that are corresponding to the position area identifier, the at least one access point name and the corresponding Internet agent capability indication information comprises:

determining, by the control-plane node based on a carrier policy, the at least one access point name and the corresponding Internet agent capability indication information from all the access point names and the Internet agent capability indication information that are corresponding to the position area identifier.

6. The method according to claim 4, wherein the determining, by the control-plane node based on all the access point names and the Internet agent capability indication information that are corresponding to the position area identifier, the at least one access point name and the corresponding Internet agent capability indication information comprises:

obtaining, by the control-plane node by using a subscription-data center, all access point names subscribed to by the user equipment and corresponding Internet agent capability indication information; and determining, by the control-plane node, the at least one access point name and the corresponding Internet agent capability indication information based on all the access point names subscribed to by the user equipment and the Internet agent capability indication information, and all the access point names and the Internet agent capability indication information that are corresponding to the position area identifier.

7. The method according to claim 1, wherein the method further comprises:

receiving, by the control-plane node, a public-network connection delete request message from the user equipment, wherein the public-network connection delete request message is sent after the user equipment determines that a data connection, corresponding to the first access point name, to the local user-plane node is successfully set up and determines that the Internet agent capability indication information corresponding to the first access point name indicates that the first access point name has an Internet agent capability; and deleting, by the control-plane node, a data connection between the user equipment and a public-network user-plane node after receiving the public-network connection delete request message.

8. The method according to claim 1, comprising: deleting, by the control-plane node, a data connection between the user equipment and a public-network user-plane node after determining that a data connection, corresponding to the first access point name, from the user equipment to the local user-plane node is successfully set up and that the Internet agent capability indication information corresponding to the first access point name indicates that the first access point name has an Internet agent capability.

9. A control-plane node, comprising:

at least one processor; and a non-transitory computer readable medium having a plurality of computer readable instructions stored thereon that, when executed by the at least one processor, cause the at least one processor to implement:

send to user equipment access information comprising at least one access point name and Internet agent capability indication information for each access point name, wherein the access information is access information of a local network in an area in which the user equipment is currently located;

receive from the user equipment a connection setup message comprising a first access point name, wherein the first access point name is determined by the user equipment based on the Internet agent capability indication information;

determine whether the first access point name is an access point name of the at least one access point name; and in response to the first access point name being an access point name of the at least one access point name, determine a corresponding local user-plane node based on the first access point name received from the user equipment, and set up a data connection from the user equipment to the local user-plane node.

10. The control-plane node according to claim 9, wherein the Internet agent capability indication information for the first access point name indicates that the first access point name has an Internet agent capability.

11. The control-plane node according to claim 9, wherein when executed by the at least one processor, further cause the at least one processor to implement:
  delete a data connection between the user equipment and a public-network user-plane node after determining that a data connection, corresponding to the first access point name, from the user equipment to the local user-plane node is successfully set up and that the Internet agent capability indication information corresponding to the first access point name indicates that the first access point name has an Internet agent capability.

12. The control-plane node according to claim 9, wherein when executed by the at least one processor, further cause the at least one processor to implement:
  receive a public-network connection delete request message from the user equipment, wherein the public-network connection delete request message is sent after the user equipment determines that a data connection, corresponding to the first access point name, to the local user-plane node is successfully set up and determines that the Internet agent capability indication information corresponding to the first access point name indicates that the first access point name has an Internet agent capability; and
  delete a data connection between the user equipment and a public-network user-plane node after receiving the public-network connection delete request message.

13. The control-plane node according to claim 9, wherein when executed by the at least one processor, further cause the at least one processor to implement:
  determine the at least one access point name and the corresponding Internet agent capability indication information.

14. The control-plane node according to claim 13, wherein when executed by the at least one processor, further cause the at least one processor to implement:
  receive a position area identifier from an access node, and the position area identifier is a position area identifier corresponding to the area in which the user equipment is currently located;
  determine all access point names and the Internet agent capability indication information that are corresponding to the position area identifier; and
  determine, based on all the access point names and the Internet agent capability indication information that are corresponding to the position area identifier, the at least one access point name and the corresponding Internet agent capability indication information.

15. The control-plane node according to claim 14, wherein when executed by the at least one processor, further cause the at least one processor to implement:
  determine, based on a carrier policy, the at least one access point name and the corresponding Internet agent capability indication information from all the access point names and the Internet agent capability indication information that are corresponding to the position area identifier.

16. The control-plane node according to claim 14, wherein when executed by the at least one processor, further cause the at least one processor to implement:
  obtain, by using a subscription-data center, all access point names subscribed to by the user equipment and corresponding Internet agent capability indication information; and
  determine the at least one access point name and the corresponding Internet agent capability indication information based on all the access point names subscribed to by the user equipment and the Internet agent capability indication information, and all the access point names and the Internet agent capability indication information that are corresponding to the position area identifier.

17. A communication device, comprising:
  a receiver, configured to receive from a control-plane node access information comprising at least one access point name and Internet agent capability indication information for each access point name, and the access information is access information of a local network in an area in which the communication device is currently located;
  a processer, configured to determine a first access point name from the at least one access point name based on the Internet agent capability indication information, wherein the first access point name is an access point name of the at least one access point name;
  a transmitter, configured to: send to the control-plane node a connection setup message comprising the first access point name, so that the control-plane node determines a corresponding local user-plane node based on the first access point name, and sets up a data connection from the communication device to the local user-plane node; and
    send a public-network connection delete request message to the control-plane node after the communication device sets up the data connection, corresponding to the first access point name, to the local user-plane node, so that the control-plane node deletes a data connection between the communication device and a public-network user-plane node.

18. The communication device according to claim 17, wherein the Internet agent capability indication information for the first access point name indicates that the first access point name has an Internet agent capability.

19. The communication device according to claim 17, wherein the communication device is a user equipment.

20. A data connection system, comprising:
  a control-plane node; and
  a user equipment, wherein:
    the control-plane node is configured to send to the user equipment access information comprising at least one access point name and Internet agent capability indication information for each access point name, wherein the access information is access information of a local network in an area in which the user equipment is currently located;
    the user equipment is configured to receive the access information, determine a first access point name based on the Internet agent capability indication information, and send a connection setup message to the control-plane node; and
    the control-plane node is further configured to receive the connection setup message, determine whether the first access point name is an access point name of the at least one access point name, and, in response to the first access point name being an access point name of the at least one access point name, determine a corresponding local user-plane node based on the first access point name, and set up a data connection from the user equipment to the local user-plane node.

21. The data connection system according to claim 20, wherein the control-plane node is further configured to:
  receive a public-network connection delete request message from the user equipment, wherein the public-network connection delete request message is sent after the user equipment determines that a data connection, corresponding to the first access point name, to the local user-plane node is successfully set up and determines that the Internet agent capability indication information corresponding to the first access point name indicates that the first access point name has an Internet agent capability; and delete a data connection between the user equipment and a public-network user-plane node after receiving the public-network connection delete request message.

22. The data connection system according to claim 20, wherein the Internet agent capability indication information for the first access point name indicates that the first access point name has an Internet agent capability.

* * * * *